Aug. 9, 1927.

M. GUIDI

ROLLER BEARING

Filed Dec. 24, 1925

1,638,029

M. Guidi
INVENTOR

By: Marles & Clark
Attys

Patented Aug. 9, 1927.

1,638,029

UNITED STATES PATENT OFFICE.

MAURIZIO GUIDI, OF SAVONA, ITALY.

ROLLER BEARING.

Application filed December 24, 1925, Serial No. 77,536, and in Italy February 5, 1925.

The present invention refers to a bearing, the brasses of which consist in a link chain which in distended condition presents one or more rows of parallel rollers in running contact with each other supported by means of pins upon the sides of U like shaped links or brackets jointly connected with each other and which link chain is arranged in the stationary bearing so that the webs of the brackets are leaning against and are firmly supported by the inner wall of the bearing and the inner row of rollers contacting with the shaft on which the bearing has to be applied.
The bearing according to the present invention can be built for different strains of one, two or more rows of rollers. The same can be applied upon the shafts and axles of which the diameter may not be known with exactness and is simply wound around the circumference of the shaft, the remaining portion of the link chain is detached and the two ends connected by an apposite link lock.

In the drawing:
Fig. 1 shows the improved roller bearing in a front view in the right hand half and in a sectional middle view in the left hand half.

Figure 1:
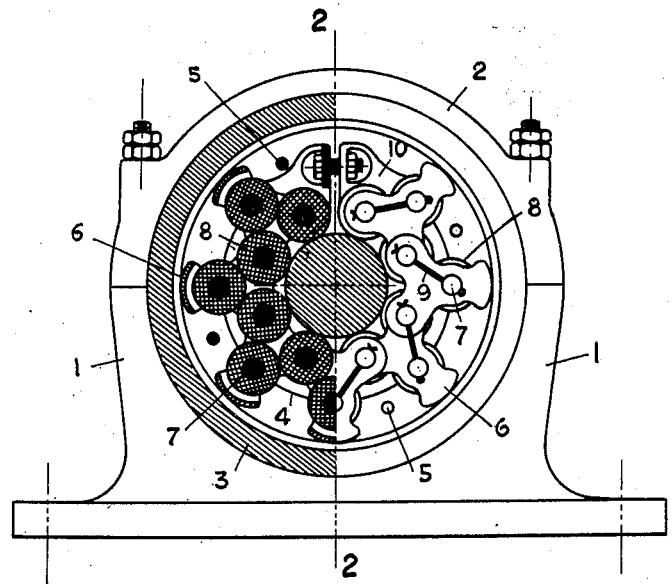
Figure 2:
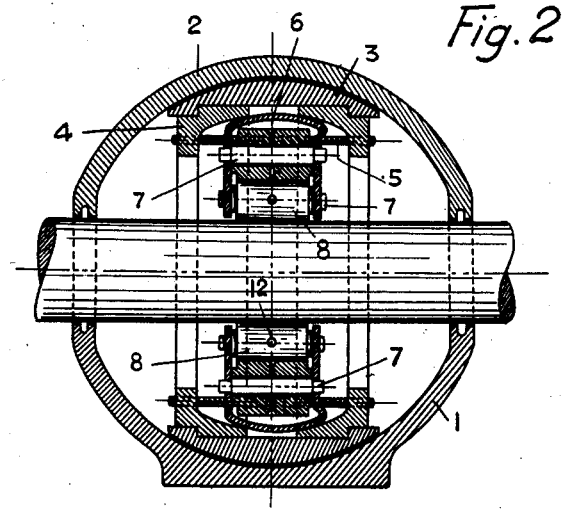
Fig. 2 is a sectional view according to line 2—2 of Fig. 1.
Figure 3:
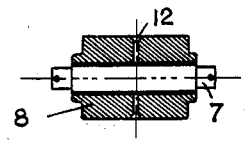
Fig. 3 is the detail of a roller.
Figure 5:
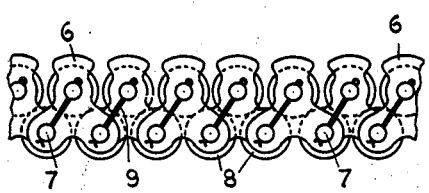
Fig. 5 is a detail of a link chain with two rows of rollers.

In these figures in which the same numbers indicate the same or similar parts 1 is the base of a shaft bearing, 2 the cover and 3 an annular oscillating body having an outer spherical surface adapted within a corresponding surface of the base 1 and of the cover 2. Within the oscillating body 3 are arranged two annular pieces 4 the distance of which can be regulated by threaded pins 5 threaded with threads of opposite pitch within the two annular pieces so that in rotating these pins the distance of these pieces can be regulated. The annular pieces 4 are provided at its interior with a spherical surface the center of which corresponds with the center of the bearing. Of the same conformation as the inner surface of the annular pieces 4 is the outer surface of the intermediate webs of the brackets 6 forming the link chain. These brackets are of U shape and upon its sides are supported the pins 7 of the rollers 8. The link chain illustrated in Figures 1 and 2 presents a double row of rollers and Fig. 5 illustrates a detail of this double row of rollers. In these figures the rollers 8 are rotatably supported upon the pins 7 which penetrate the thicknesses of the sides of the U shaped brackets and split pins 9 attraverse the end portions of the pins 7 at the outside of the brackets and prevent the axial displacement of the rollers and the rotative displacement of the pins.

Figure 6:
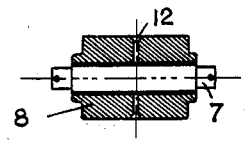
Fig. 6 shows the chain lock in two views which lock serves to connect the two ends of the link chain.
Figure 4:
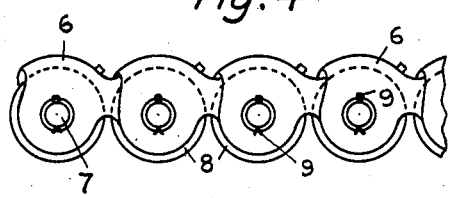
Fig. 4 is a detail of a link chain with one row of rollers.

Fig. 4 shows a link chain with only one row of rollers. In this figure the brackets 6 are again of U shape with a curvature of the intermediate webs to correspond with the inner curvature of the annular rings 4 and these brackets are jointly connected with each other on the axis of one row of rollers supported upon pins 7 traversing the sides of the brackets 6 and locked at the outside of the brackets by split pins 9. The ends of the chain are coupled together by a special lock of which Fig. 6 shows a type adapted for a two roller row link chain. This lock consists of two special end brackets 10 adapted to support as the other brackets the end rollers of the chain and to constitute in connection with a threaded rod 11 a means for circumferentially tending the link chain and to keep same in a tended condition.

12 are holes in the walls of the rollers which during the quick rotation of the rollers provoke an aspiration of lubricating oil upon the pins of the brackets.

The special shape of the annular pieces 4 and the means 5 for varying its distance allowing to regulate the exact contact of the rollers with the shaft also allow to gradually eliminate the clearance which may be created during the working of the bearing creating thus a roller bearing which can be regulated.

During the rotation of the shaft the rollers in contact with it are all put in rotation in the same direction and without any friction as each roller does not encounter other resistance, than that upon its proper pin. The rollers of this first row act upon pairs of the corresponding rollers of the adjacent row and concede to them a motion in the opposite direction to the proper one and the load is thus divided upon a bigger number of pins or rollers than with the one row roller bearing.

I claim:—

1. A roller bearing for a rotating shaft comprising in combination, a plurality of links forming a connected chain, a roller rotatably secured in each of said links, a pair of rings forming a concave race, each of said links having a convex portion adapted to rest in said race, means for connecting the ends of said chain, and means for moving said rings relatively to each other.

2. A roller bearing comprising a link chain, a plurality of rollers loosely mounted and arranged thereon in two annular rows, means to maintain the rollers of one row in rolling contact with the corresponding rollers of the adjacent row, said rollers being supported by pins carried by the side portions of U-shaped links connected with each other to form the link chain, and an outer stationary bearing in which the chain is arranged so that the intermediate webs of the links remain in contact with and are firmly supported by the inner wall of the bearing, the inner row of rollers being in contact with the shaft which is to be supported by the bearing.

3. A roller bearing comprising a link chain, a plurality of rollers loosely mounted and arranged thereon, said rollers being supported by pins carried by the side portions of U-shaped links connected with each other to form a link chain, and an outer stationary bearing in which the chain is arranged so that the intermediate webs of the links or brackets are firmly supported by the inner wall of the bearing, the rollers being in contact with the shaft which is to be supported by the bearing.

4. A roller bearing comprising a link chain, a plurality of rollers loosely mounted and arranged thereon in two annular rows, means to maintain the rollers of one row in rolling contact with the corresponding rollers of the adjacent row, said rollers being supported by pins carried by the side portions of U shaped links connected with each other to form the link chain, and a pair of rings adjustably arranged with respect to each other and symmetrically arranged with respect to the middle plane of the bearing, said rings having an inner spherical surface which corresponds with the outer surface of the intermediate webs so that the exact contact of the rollers with the shaft can be regulated.

5. A roller bearing comprising a link chain, a plurality of rollers loosely mounted and arranged thereon, said rollers being supported by pins carried by the side portions of U-shaped links connected with each other to form a link chain, and a pair of rings adjustably arranged with respect to each other and symmetrically arranged with respect to the middle plane of the bearing, said rings having an inner spherical surface which corresponds with the outer surface of the intermediate webs of said links so that the exact contact of the rollers with the shaft can be regulated.

In testimony whereof I hereunto affix my signature.

MAURIZIO GUIDI.